United States Patent [19]

Lansdale

[11] Patent Number: 5,013,050
[45] Date of Patent: May 7, 1991

[54] SEAL INSTALLATION

[75] Inventor: William B. Lansdale, Runwell, England

[73] Assignee: Ford Motor Company, Dearborn, Mich.

[21] Appl. No.: 416,759

[22] Filed: Oct. 3, 1989

Related U.S. Application Data

[62] Division of Ser. No. 135,883, Dec. 21, 1987.

[30] Foreign Application Priority Data

Dec. 23, 1986 [GB] United Kingdom ............... 8630708

[51] Int. Cl.$^5$ ............... F16J 15/32; B23P 19/04; B23Q 3/00
[52] U.S. Cl. ..................... 277/9.5; 29/235; 29/464; 277/1; 277/189; 277/153
[58] Field of Search ............ 277/9, 9.5, 11, 153, 277/152, 237 A, DIG. 4, 1, 35, 10, 189; 29/235, 464

[56] References Cited

U.S. PATENT DOCUMENTS

| | | | |
|---|---|---|---|
| 2,357,139 | 8/1944 | Seme | 29/235 X |
| 2,405,120 | 8/1946 | Evans . | |
| 2,481,793 | 9/1949 | Stewart | 277/11 |
| 2,804,324 | 8/1957 | Stallings | 277/153 |
| 2,807,079 | 9/1957 | Josephson | 29/235 |
| 2,998,987 | 9/1961 | Taschenberg et al. | 277/153 X |
| 3,030,702 | 4/1962 | Fowler . | |
| 3,165,949 | 1/1965 | Thill . | |
| 3,447,819 | 6/1969 | Borsum et al. . | |
| 3,694,894 | 10/1972 | Jelinek et al. | 29/235 X |
| 3,866,813 | 2/1975 | Arnold | 277/9 |
| 3,917,286 | 11/1975 | Loyd | 277/153 X |
| 3,947,944 | 4/1976 | Washington | 29/235 |
| 4,218,813 | 8/1980 | Cather, Jr. | 277/11 X |
| 4,229,870 | 10/1980 | Tate . | |
| 4,437,821 | 3/1984 | Ogawa | 277/9 X |
| 4,484,751 | 11/1984 | Deuring | 277/DIG. 4 |
| 4,515,376 | 5/1985 | Okamuro | 277/9.5 |
| 4,521,040 | 6/1985 | Slyker et al. . | |
| 4,586,228 | 5/1986 | Rodolf | 29/235 |
| 4,588,195 | 5/1986 | Antonini et al. | 277/153 |
| 4,625,977 | 12/1986 | Azibert et al. | 277/9 X |
| 4,750,747 | 6/1988 | Hölzer | 277/153 X |

FOREIGN PATENT DOCUMENTS

| | | | |
|---|---|---|---|
| 139503 | 5/1985 | European Pat. Off. . | |
| 188140 | 7/1986 | European Pat. Off. . | |
| 262807 | 12/1912 | Fed. Rep. of Germany . | |
| 1258687 | 1/1968 | Fed. Rep. of Germany . | |
| 2340275 | 10/1974 | Fed. Rep. of Germany . | |
| 1186768 | 9/1959 | France | 277/153 |
| 861077 | 2/1961 | United Kingdom | 29/235 |
| 1446275 | 8/1976 | United Kingdom . | |
| 1512109 | 5/1978 | United Kingdom . | |
| 2009867 | 6/1979 | United Kingdom . | |
| 2058960 | 4/1981 | United Kingdom | 277/153 |
| 2121126 | 12/1983 | United Kingdom . | |
| 2133840 | 8/1984 | United Kingdom . | |

*Primary Examiner*—Allan N. Shoap
*Attorney, Agent, or Firm*—Roger L. May; Damian Porcari

[57] ABSTRACT

A storage and application tool for installing a seal in a gap in a device, such as an oil seal around a rotating shaft, comprises a tool, optionally disposable, having an axially extending cylindrical surface on which the seal is demountably mounted during storage, transport and installation of the seal. The tool further comprises an axially forward facing second surface extending radially outwardly beyond the axially extending cylindrical surface for limiting the extent of axial insertion of the tool into the gap to be closed by the seal. According to a second embodiment of the invention, the inner diameter of an annular seal is mounted at the periphery of a generally circular end plate adapted to be attached to a component of the device. An installation tool engaging the end plate provides an axially extending cylindrical surface to enclose and support the free outer diameter of the seal and to act as a centering guide for the seal/end plate assembly. Following installation of the seal, the tool is withdrawn and may be discarded.

6 Claims, 3 Drawing Sheets

SEAL INSTALLATION

This is a division of application Ser. No. 07/135,883, filed Dec. 21, 1987.

This invention relates to the installation of seals in gaps between adjacent components. The invention is particularly concerned with placing annular seals in annular gaps between a stationary part and a rotating part. Typical of annular seals are lipped oil seals around rotating shafts in internal combustion engines. The invention can also be applied to the placing of rubber coated core plugs in bores which are to be closed off and sealed.

Seals of this type are delicate and need to be carefully handled for transport and storage purposes. The seal lips should not be distorted or deformed before the seal is put into place. It has been known for some time to store annular seals on cylindrical supports which support the internal periphery of the seal, in order to avoid damage to this part of the seal before it is fitted.

It is also important that the seal is fitted centrally in the gap to be sealed, with the support for the external circumference of the seal being properly centered relative to the shaft center. The function of the seal will be adversely affected if the gap is wider on one side than the other.

Conventionally, when the seal is to be fitted, a special tool is required and this tool has to be the correct size to suit the seal and to suit the gap into which the seal is to be fitted. The tool also has to expand the seal to enable it to be inserted into the gap. Thus, if there is a requirement to fit seals of various different sizes, a number of different dedicated tools will be required. Furthermore, because it is often necessary to insert the seal fully into a gap between two components, it is often a requirement that the tool should be capable of entering the gap. If the tool has been damaged in any way, for example by having been dropped on the floor, it may be unusable.

According to the present invention, there is provided a storage and application tool for seals, the tool comprising a cylindrical region for supporting a seal around its inner periphery during transport and storage and adapted to accompany the seal to the location where the seal is to be fitted, and an annular portion surrounding the first region and adapted to control the final position of the seal.

The term "seal" is used in this specification to include for example both annular lipped seals for use in providing a dynamic seal between an internal lip on the seal and a rotating shaft surrounded by the seal, as well as core plugs which have a sealing periphery forming a static seal with the internal periphery of a bore.

The tool may be used in the application of a seal to an annular gap between a shaft and a fixed body such as an engine block, or in the application of a housing which includes a pre-mounted seal to a shaft projecting from a fixed body.

Where the tool is used in the installation of a seal into an annular gap, it is preferably constructed so that the friction between the cylindrical region and the inner periphery of the seal is less than the friction between the outer periphery of the seal and the outer wall of the annular gap, so that the seal stays in place whilst the tool is withdrawn.

The tool is preferably adapted to be a one-use tool which is discarded after use. The tool can be of a plastics material.

The tool is preferably also adapted to determine the depth at which the seal is located in the gap, and to this end may have an annular flange which abuts against the surface of the outer or inner component in order to limit the depth of insertion.

The seal may be secured to the tool for transport and storage by adhesive which will provide a bond sufficiently strong to hold the seal in place, but weak enough to be ruptured when the tool is withdrawn from the gap leaving the seal in place.

Alternatively, the seal may be lubricated with a suitable grease or other lubricant when it is placed on the tool, and the presence of this lubricant can hold the seal in place. Correct lubrication of the seal on installation is very important, and this pre-lubrication of the seal can make it possible to dispense with the application of further lubricant at the time of installation, and thus also to ensure that the correct lubricant is used.

The necessary force to position the seal within the gap can be applied either by a direct thrust applied to the tool, in which case the tool will have a head suitable for receiving the necessary hammer impacts, or by tightening a bolt threaded into a bore in one of the components, in which case the tool can have a hole through which the bolt extends as it is being tightened.

The invention also provides a combination comprising a tool as set forth above with a seal mounted on it.

According to a second aspect of the invention, there is provided a seal unit comprising an end plate with an aperture in it, a seal with its outer periphery supported around the aperture in the plate, and a tool which has a cylindrical region supporting the seal around its inner periphery during transport and storage and adapted to fit, with the seal, around a shaft to which the seal is to be fitted, and an annular portion surrounding the first region and engaging with the end plate to control the centricity of the cylindrical region relative to the aperture in the plate.

According to a third aspect of the invention, there is provided a storage and application tool for a core plug with a sealing periphery, the tool comprising a head adapted to enter the bore where the plug is to be fitted and to drive the plug into place, a flange at one end of the head to limit the depth of insertion of the plug, and means for holding the plug on the other end of the head whilst it is being inserted, the holding means being arranged so that the tool can be easily removed once the plug is fully inserted, leaving the plug in place.

The tool is preferably of plastics, and the holding means may comprise radially outwardly directed resilient lips which engage an inwardly facing surface on the plug.

The invention will now be further described, by way of example, with reference to the accompanying drawings, in which.

Figure 1:
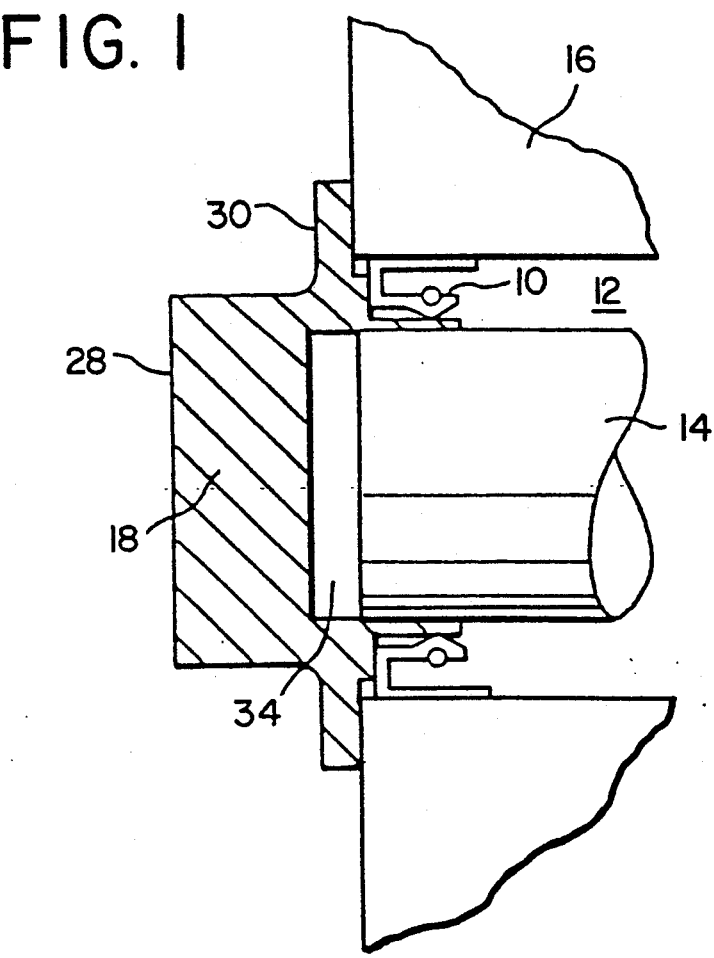
FIG. 1 is a cross section through a tool in accordance with the invention, showing the tool in use in fitting a seal.

FIG. 1 shows an annular oil seal 10 being fitted in the gap 12 between a rotatable shaft 14 and a fixed housing 16. The seal 10 is applied by a tool 18. The tool is of a simple shape, as can be seen in FIG. 1 and is conveniently a plastics moulding of low cost so that it can be discarded once the seal 10 has been fitted.

Figure 2:
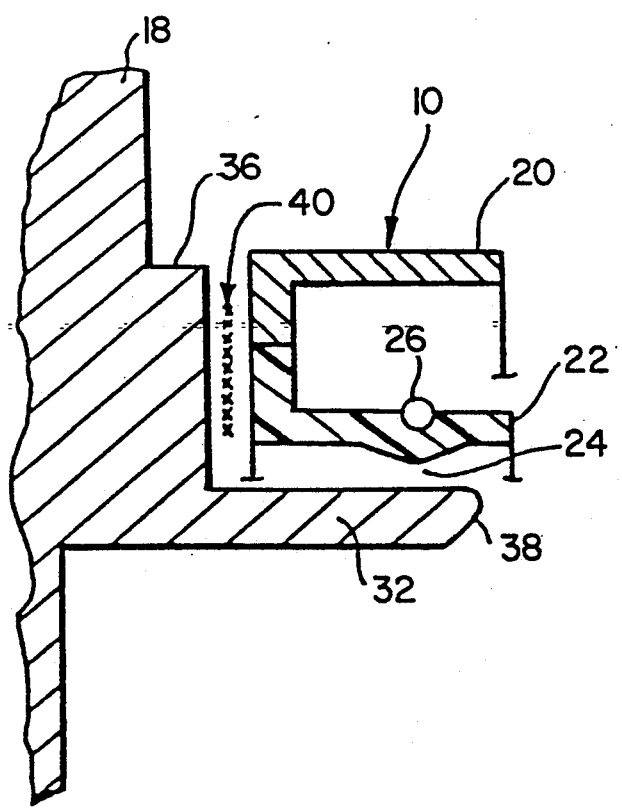
FIG. 2 is an enlarged view partially broken away and exploded, of the central area of FIG. 1.

In FIG. 2, the seal 10 is shown in cross section on a larger scale. The outer part 20 of the seal is primarily of metal and is intended to be an interference fit with the inner diameter of the housing 16. Although this part of the seal is predominantly of metal, it may have a rubber coating.

The inner part 22 of the seal is predominantly of rubber, although it may have a metal carrier, and has a sealing lip 24 which is adapted to make sealing contact with the external circumference of the rotating shaft 14. An annular spring 26 in the form of a wire ring supports the lip 24 to ensure that proper sealing contact is maintained. Some seals are constructed without this spring.

The tool 18 has a head 28, an annular flange 30 and a cylindrical support region 32. The support region 32 surrounds a hollow cylindrical cavity 34.

In use, the seal 10 is fitted onto the support region 32. It should be noted that the relative positions of the seal and the tool in FIG. 2 are not as they will be in practice, the seal being shown out of contact with the sleeve for clarity of illustration. In practice, the seal will be stressed when it is in place on the support region 32, because the outer diameter of this region inevitably has a greater circumference than the outer surface of the shaft 14 against which the seal will ultimately operate. A step 36 on the tool will have a diameter slightly smaller than the outer diameter of the outer part 20 of the seal and slightly smaller than the inner diameter of the housing 16, to enable the tool to enter the gap 12 with the seal.

The tool and the seal are assembled to the relative positions shown at the time of manufacture. The support region 32 supports the seal while it is being stored and transported. This ensures that the seal does not accidently become distorted and that the sealing lip 24 does not get damaged.

A seal of this type will always be accurately related to the gap which it has to fill, i.e. either the gap will be dimensioned to accept a standard size of seal or the seal will be designed to operate in a specific gap. The tool 18 will have to follow the same criteria, and be designed for each particular application.

To apply the seal to the gap 12 between the components 14 and 16, the tool bearing the seal is offered up to the gap and is pressed into the gap. It will be noted that the leading end of the support region 32 is chamfered at 38 to facilitate entry. As the tool is pushed home, the outer region 20 of the seal will come into contact with the inner surface of the bore in the housing 16 and will fit tightly against it. The tool is driven home until the flange 30 lies flush against the outer face of the housing 16, and in this way the depth of the shoulder 36 will determine the position at which the seal is located in the gap. Clearly this shoulder can be altered in size in accordance with the desired end position of the seal. Once the tool has been driven fully home, it is then necessary to remove it, while leaving the seal in place. The seal is normally held in place on the tool by the friction between the lip 24 and the support region 32. However once the seal has been properly located, the friction between the outer region 20 of the seal and the housing 16 will be greater than that between the lip 24 and the support 32, so that the tool can be withdrawn. It may be necessary to incorporate on the head 28 of the tool some gripping formation which will allow a tool to be connected to the head to help withdrawal.

In order to ensure that the seal remains on the support region 32 during transport and storage, it may be useful to apply a small quantity of adhesive as indicated by reference numeral 40, between the seal and the tool. This adhesive would be of a low-tack character so that the adhesive bond would be ruptured on withdrawing the tool.

Figure 3:
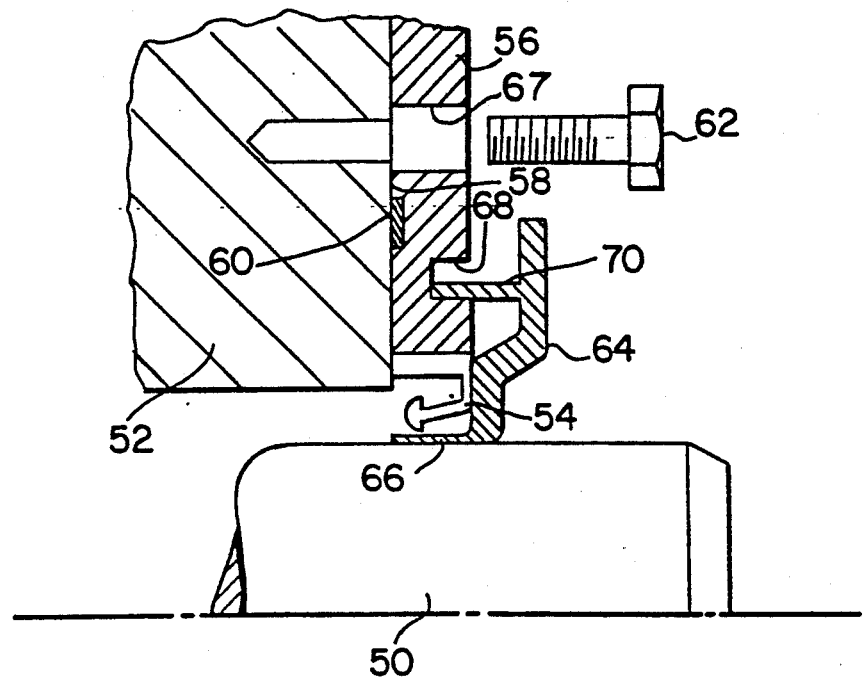
FIG. 3 is a cross section through a first embodiment of seal unit in accordance with the invention.
Figure 4:
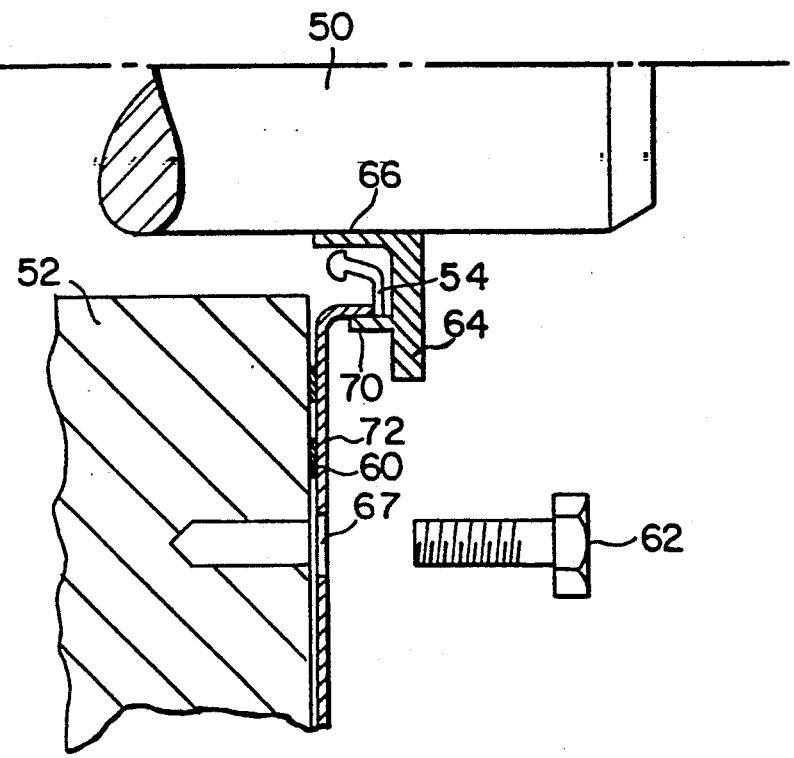
FIG. 4 is a cross section through a second embodiment of seal unit in accordance with the invention.

FIGS. 3 and 4 each show a seal unit where a plastics ring tool is used both to protect the thin elastomer seal lip and to centralize a seal cover on a shaft. In these figures, a shaft is shown at 50 projecting from an engine block 52.

In FIG. 3, an annular seal 54 is mounted in a circular aperture in an end plate 56. The seal and end plate are pre-assembled, and may be vulcanized together. The end plate is to be mounted to an end face 58 of the block, with a static seal 60 between the plate and the block, by means of bolts 62, only one of which is shown.

The size of the bolt holes 67 in the end plate relative to the diameter of the bolts 62 is such that there is a degree of uncertainty about the centricity of the aperture relative to the shaft. To minimize this uncertainty (as well as to protect the seal in the ways already described), a plastics tool 64 is used.

The tool 64 has a cylindrical region 66 which supports the sealing lip of the seal 54. The end plate 56 has an annular groove 68 and an annular flange (or a series of fingers) 70 on the tool fits into the groove. The groove 68 is concentric with the aperture so that the internal diameter of the cylindrical region 66 is now centered in the aperture. The internal tool diameter is however a snug fit on the shaft so that when the tool/seal/endplate assembly is positioned as shown in FIG. 3, the seal is central relative to the shaft. The bolts 62 can then be put in place and tightened and then the tool is withdrawn, as already described, leaving the seal lip in its correct operating position.

FIG. 4 shows a similar arrangement, but in this case the seal lip is directly moulded as a continuation of the end plate 72 which this time is formed as a metal pressing or as a plastics moulding, and the flange 70 fits over an outturned rim around the seal.

The use of a disposable tool in this way can substantially reduce assembly times for the seal in the gap, and this reduction considerably outweighs the slight extra cost of providing a throwaway tool with each seal. Furthermore, the degree of care needed in fitting the seal is substantially reduced so that it becomes possible for seal installation to be carried out robotically.

Figure 5:
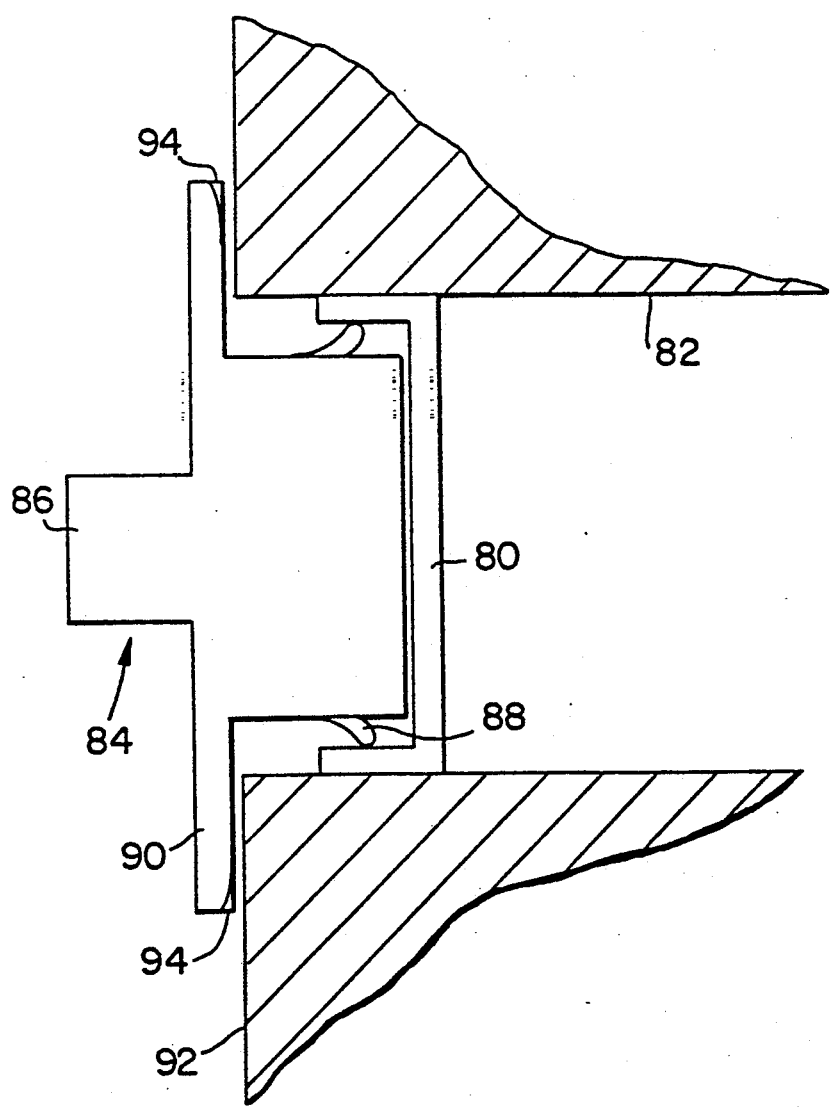
FIG. 5 is a cross section through a tool being used to place a core plug.

FIG. 5 shows a tool used to place a rubber coated core plug 80 in a bore 82. The tool 84 has a head 86 which contacts the plug and enables it to be pushed into position in the bore where the rubber coating seals against the wall of the bore. The plug has an upstanding periphery, and lips 88 (for example three lips equally spaced around one end of the head 86) engage with this periphery to hold the plug on the tool during transport and storage. The plug and tool are pushed into the bore until a flange 90 comes up against the face 92, and this determines the depth of insertion. Once the plug is in place, the tool can be removed. The force holding the tool to the plug will be less than the friction between the plug and the bore, so that the tool can be withdrawn without displacing the plug.

Bevels 94 are provided below the flange 90, so that another tool can be inserted to pry the tool off after insertion of the plug.

Other advantages resulting from the use of a tool as described are as follows:

(i) mounting the seal on the tool before transportation and storage of the seal reduces the risks of damage to the lip of the seal;

(ii) if the seal is pre-lubricated, one can be certain that the correct lubricant is used;

(iii) the provision of a tool with each seal ensures that the correct tool is always used;

(iv) the need for each workshop to hold a wide range of dedicated tools is avoided;

(v) fitting of the seal is no longer a skilled operation; and (vi) the seal will be fitted on the tool under controlled, dirt-free conditions.

I claim:

1. A seal assembly for demountably mounting a seal in an angular gap between an axially extending shaft and a cylinder wall of a device, said assembly comprising:

surrounding an axial extent of said shaft an endplate comprising (i) means for mounting said endplate to a lateral surface of the device radially outward of and substantially normal to the gap, the radially inner periphery of the lateral surface defining an outer axial extremity of the gap, and (ii) a cylindrical alignment surface radially outward of said gap;

a seal having (i) a sealing surface on an axially extending sealing lip for sealing against said shaft, and (ii) a second surface coaxially aligned and fixed to said endplate; and a tool comprising (i) an axially extending cylindrical projection, said projection having a first surface supporting said sealing lip by engagement with said sealing surface of said seal during storage and application, and said projection having a second surface engaging said shaft; and (ii) a third surface integral with said projection, said third surface extending to engagement with said cylindrical alignment surface of said endplate and coaxially aligning said endplate and tool about said shaft, said endplate being fixed in a position radially relative to said tool.

2. The seal assembly according to claim 1, wherein said means for mounting said endplate comprises an aperture in said endplate and a bolt extending therethrough alignable with a bolt-receiving aperture in the lateral surface of the device.

3. The seal assembly according to claim 2, further comprising seal material carried on a surface of said endplate adapted to be seated against the lateral surface of the device to form a static seal therewith.

4. The seal assembly according to claim 1, wherein said seal is vulcanized to said endplate.

5. The seal assembly according to claim 1, wherein said tool is fabricated of a plastic material.

6. The seal assembly according to claim 1, wherein said seal is coated with lubricant.

* * * * *